United States Patent [19]

Mahmoud

[11] Patent Number: 4,670,268

[45] Date of Patent: Jun. 2, 1987

[54] ENTERAL NUTRITIONAL HYPOALLERGENIC FORMULA

[75] Inventor: Mohamed I. Mahmoud, Columbus, Ohio

[73] Assignee: Abbott Laboratories, Abbott Park, Ill.

[21] Appl. No.: 827,295

[22] Filed: Feb. 6, 1986

Related U.S. Application Data

[63] Continuation-in-part of Ser. No. 695,993, Jan. 29, 1985, abandoned.

[51] Int. Cl.⁴ .................... A23C 11/02; A23D 5/00; A23L 1/302
[52] U.S. Cl. ................................. 426/72; 426/74; 426/602; 426/613; 426/658; 426/661; 426/804
[58] Field of Search ............... 426/72, 74, 98, 601, 426/602, 603, 604, 654, 656, 657, 658, 661, 804

[56] References Cited

U.S. PATENT DOCUMENTS

| | | | |
|---|---|---|---|
| 3,950,547 | 4/1976 | Lamar, III et al. | 426/654 X |
| 4,045,589 | 8/1977 | Petrowski et al. | 426/661 X |
| 4,414,238 | 11/1983 | Schmidl | 426/72 X |
| 4,492,714 | 1/1985 | Cooper et al. | 426/602 |

*Primary Examiner*—Robert Yoncoskie
*Attorney, Agent, or Firm*—Martin L. Katz; Margaret M. O'Brien

[57] ABSTRACT

An improved enteral nutritional hypoallergenic formula is disclosed. The formula contains carbohydrates, lipids, protein hydrolysate, vitamins and minerals and a starch modified by octenyl succinic anhydride which is utilized as the sole lipid emulsifying agent to provide a nutritionally well-balanced dietary formula.

11 Claims, No Drawings

ENTERAL NUTRITIONAL HYPOALLERGENIC FORMULA

This is a continuation-in-part of U.S. patent application Ser. No. 695,993 filed on Jan. 29, 1985 now abandoned.

FIELD OF THE INVENTION

The invention relates to improved enteral nutritional hypoallergenic formulas and more particularly to hypoallergenic formulas which contain a unique fat emulsifying system.

BACKGROUND OF THE INVENTION

Hypoallergenic formulas or compositions, which are also referred to as elemental formulas, are characterized in that they contain protein hydrolysates such as soy protein hydrolysate, casein hydrolysate, whey protein hydrolysate or a combination of animal and vegetable protein hydrolysates as a major source of nitrogen. The protein hydrolysates comprise short peptide fragments and/or free amino acids instead of the intact protein found, for example, in cow's milk and soy protein isolate-based formulas. These short peptide fragments and free amino acids have been found to be less immunogenic or allergenic than intact proteins.

In addition to protein hydrolysates, most nutritionally balanced hypoallergenic formulas contain carbohydrates, lipids, vitamins, minerals and are supplemented with additional amino acids to upgrade the nutritional quality of such formulas. These hypoallergenic formulas are utilized for feeding infants, children and adults who have allergies or sensitivities to intact protein, and are often medically used in the treatment of cystic fibrosis, chronic diarrhea, galactosemia, small bowel resection, steatorrhae and protein-calorie malnutrition.

One well known problem in the preparation of hypoallergenic formulas is that extensive protein hydrolysis by acids or enzymes is necessary to provide the short peptides and amino acids utilized in the formulas to render such formulas hypoimmunogenic. These extensively digested and hypoimmunogenic protein hydrolysates have the undesirable characteristic of loss of capacity to emulsify fat and form physically stable emulsions that do not separate during storage.

Another common problem encountered in the preparation of hypoallergenic formulas is the formation of undesirable brown color as a result of the reaction between the carbonyl groups of reducing sugars and the nitrogen-amine-containing compounds such as amino acids in the formula (Maillard type reaction), especially at elevated temperatures encountered during sterilization. In addition to the brown color formation, Maillard type reaction also results in loss of the nutritional value of the protein hydrolysate.

U.S. Pat. No. 4,414,238 shows an elemental diet composition comprising carbohydrates, amino acids and/or low molecular weight peptides and lipids. The elemental diet of that patent has a lipid component in the form of an emulsion consisting of lipids, an emulifier selected from the group consisting of mono- and diglycerides, and a corn starch modified with succinic anhydride and is stable and non-browning at a low pH of about 3 to 4.4.

The present invention provides an improved hypoallergenic formula which does not require emulsifiers such as mono- or diglycerides, does not form a brown color at a higher pH range than previous hypoallergenic formulas, and is a stable emulsion. Furthermore, the hypoallergenic formula of the present invention enables suspension of the insoluble calcium and phosphorus salts which are commonly contained in such formulas.

SUMMARY OF THE INVENTION

The present invention is an improved hypoallergenic formula comprising carbohydrates, lipids, a protein hydrolysate, vitamins and minerals and a starch modified by octenyl succinic anhydride which is the sole emulsifying agent. The invention is based on the discovery that the lipophilic moiety of the modified starch of the present invention results in a stable emulsion which is non-browning at a higher pH than previous hypoallergenic formulas.

DETAILED DESCRIPTION OF THE INVENTION

The hypoallergenic formula of the invention is made by blending carbohydrates, lipids, and a protein hydrolysate, homogenizing the mixture into a stable emulsion and sterilizing the product in the pH range from about 6 to about 7.

The protein hydrolysate of the invention may be any suitable protein hydrolysate utilized in a nutritional formula such as soy protein hydrolysate, casein hydrolysate, whey protein hydrolysate, animal and vegetable protein hydrolysates, and mixtures thereof. The protein hydrolysate of the hypoallergenic formula of the invention is preferably a soy protein hydrolysate or a casein hydrolysate comprising short peptides and amino acids. The immunogencity of the formula of the present invention depends largely on the extent of hydrolysis of the selected protein hydrolysate. To insure hypoimmunogenicity of the formula, the protein hydrolysate should be extensively hydrolyzed to yield very short peptides and free amino acids. This is important since free amino acids and di- and tripeptides are known to be absorbed through the small intestine without any digestive breakdown. Large molecular weight peptides are preferably avoided because they generate a more antigenic formula and cause precipitation and emulsion destabilization. In a preferred embodiment, the protein hydrolysate of the invention contains a high percentage of low molecular weight peptide fragments.

Preferably, the protein hydrolysate of the present invention is hydrolyzed to such an extent that the ratio of the amino nitrogen (A.N.) to total nitrogen (T.N.) ranges from about 0.4 A.N. to 1.0 T.N. to about 0.7 A.N. to 1.0 T.N. Such extent of hydrolysis generally yields protein hydrolysate with the following molecular weight distribution:

| Molecular Weight (Daltons) | Percent in Hydrolysate |
|---|---|
| <500 | 77–95 |
| 500–1500 | 3–12 |
| 1500–5000 | 1–7 |
| >5000 | <3 |

The hydrolyzed protein source of the hypoallergenic formula is also preferably supplemented with various free amino acids to provide a nutritionally balanced amino acid content. Examples of such free amino acids include L-tryptophan, L-methionine, L-cystine, L-tyrosine, L-arginine, taurine and carnitine. The amount of protein hydrolysate and supplemented free amino acid mixture in the hypoallergenic formula may range from about 8% to about 20% of the total calories of the formula and is preferably in the range of about 10% to about 14% of total calories.

Carbohydrate sources which may be utilized in the hypoallergenic formula include sucrose and low D.E. maltodextrins and hydrolyzed starches in combination with an octenyl succinic anhydride modified starch. D.E. refers to dextrose equivalent which is a measure of the total reducing power of a carbohydrate source expressed as anhydrous dextrose and calculated as a percent of the total solids. In a hypoallergenic formula, which contains an extensively digested protein hydrolysate, the use of a low D.E. hydrolyzed starch is particularly important to minimize Maillard type reaction and brown color formation. Examples of low D.E. hydrolyzed starches include corn maltodextrin, tapioca maltodextrin and rice maltrodextrin with a D.E. of 10 or lower. Preferably, the carbohydrate source of the hypoallergenic formula is sucrose and an octenyl succinic anhydride modified starch. Examples of octenyl succinic anhydride modified starches which can be utilized in the hypoallergenic formula include corn, tapioca and rice starches modified with octenyl succinic anhydride. The preferred octenyl succinic anhydride modified starch of the invention is octenyl succinic anhydride modified corn starch.

The amount of the total carbohydrate in the hypoallergenic formula may range from about 35% to about 60% of the total calories of the formula. Preferably, the carbohydrate content is in the range of from about 40% to about 45% of total calories.

The lipid source of the hypoallergenic formula preferably comprises a mixture of safflower oil, MCT oil (medium chain triglycerides) and soy oil. Examples of other suitable lipid sources for the formula include corn oil, coconut oil, sunflower oil and olive oil. A preferred lipid or lipid mixture for the hypoallergenic formula should contain at least 10% of the fatty acids as linoleic acid (18:2). The amount of the lipid component in the hypoallergenic formula may range from about 35% to about 55% of the total calories of the formula and preferably is in the range of about 45% to about 50%.

The emulsion system of the hypoallergenic formula is solely based on an octenyl succinic anhydride modified starch. The octenyl group of the modified starch imparts hydrophobicity to the starch molecule and greatly increases the affinity of the starch to fat. The succinate gives a net negative charge to the starch molecule which increases the hydrophilic nature of the molecule. Thus, the chemical modification of the starch with octenyl succinic anhydride renders the starch molecule an anionic polyelectrolyte surface active macromolecule. These surface active substances are more effective emulsifiers than the non-ionic surfactants of the mono- and diglycerides. Being a polyelectrolyte surface active macro-molecule, the octenyl succinic anhydride modified starch stabilizes the emulsion by charge stabilization and adsorption at the surface of the fat globule, thus encapsulating the fat globules. The fat globule encapsulation by the starch leads to the formation of a stable emulsion.

The octenyl succinic anhydride modified starch is prepared by esterifying a dextrinized, ungelatinized waxy corn starch with 1-octenyl succinic anhydride. The octenyl succinic anhydride modified starch of the invention contains octenyl succinic acid ester at a maximum level of about 3%. Examples of commercially available octenyl succinic anhydride modified starches of the present invention are NATIONAL 78-00046 and CAPSUL ® from National Starch and Chemical Corporation. The amount of total octenyl succinic anhydride modified starch in the formula is provided in an amount sufficient to form a stable, nonbrowning emulsion at a pH from about 6 to about 7. The preferred octenyl succinic anhydride modified starch content of the formula is in the range of from about 10% to about 20% of total calories.

Mono- and diglycerides, lecithin and polyglycerol esters of fatty acids were found to be ineffective in producing stable hypoallergenic formula. Hypoallergenic formula made with these emulsifiers yielded unstable emulsions and developed an objectionable cream layer within 24 hours of sterilization. On the other hand, hypoallergenic formula made with octenyl succinic anhydride modified starch exhibited an excellent emulsion stability with negligible cream layer formation after 9 months of storage at room temperature.

The formula also contains a stabilizer such as lambda carrageenan. Lambda carrageenan increases the viscosity of the formula without forming a gel structure, thus retarding the fallout of the insoluble calcium and phosphorus salts used in the formula. Xanthan gum may also be used in hypoallergenic formula as a stabilizer in the same fashion as lambda carrageenan. In addition, the hypoallergenic formula contains vitamins and minerals.

The hypoallergenic formula is formulated with a pH between about 6 and about 7 to closely simulate the pH of human milk. Low pH values such as 3–4 may cause acidosis in infants fed the hypoallergenic formula.

The ingredients of the hypoallergenic formula of this disclosure are set forth in Table I.

TABLE I

| Ingredients | Per Liter (676.3 K calories) Preferred Amount |
|---|---|
| Water | 899.0 gram |
| Sucrose | 44.5 gram |
| Modified Corn Starch (octenyl succinic anhydride modified waxy corn starch) (5% $H_2O$) | 26.3 gram |
| Soy Protein Hydrolysate or Casein Hydrolysate | 23.25 gram |
| Safflower Oil | 15.00 gram |
| MCT Oil (medium chain triglycerides) | 18.73 gram |
| Soy oil | 3.75 gram |
| Calcium Citrate | 1.34 gram |
| Calcium Hydroxide | 0.60 gram |
| Calcium Phosphate Monobasic | 0.96 gram |
| Potassium Chloride | 0.22 gram |
| Magnesium Chloride | 0.22 gram |
| Sodium Chloride | 0.13 gram |
| Potassium Citrate | 0.66 gram |
| Ferrous Sulfate | 59.70 mg |
| Zinc Sulfate | 26.38 mg |
| Copper Sulfate | 2.69 mg |
| Manganese Sulfate | 0.37 mg |
| Carrageenan (lambda type) | 0.52 gram |
| Ascorbic Acid | 0.18 gram |
| Choline Chloride | 70.30 mg |
| Inositol | 44.82 mg |
| Alpha-Tocopheryl Acetate | 23.00 mg |
| Niacinamide | 12.25 mg |
| Calcium Pantothenate | 7.50 mg |
| Vitamin A Palmitate | 2.09 mg |
| Thiamine Chloride Hydrochloride | 0.75 mg |
| Riboflavin | 0.90 mg |
| Pyridoxine Hydrochloride | 0.70 mg |
| Folic Acid | 0.23 mg |
| Phylloquinone | 0.11 mg |
| Biotin | 0.05 mg |
| Vitamin $D_3$ | 0.011 mg |

TABLE I-continued

| Ingredients | Per Liter (676.3 K calories) Preferred Amount |
|---|---|
| Cyanocobalamin | 4.50 mcg |
| L-Cystine dihydrochloride | 0.17 gram |
| L-Methionine | 0.19 gram |
| L-Tryptophan | 0.23 gram |
| L-Tyrosine | 0.11 gram |
| Taurine | 45.0 mg |
| L-Carnitine | 14.2 mg |

The following example illustrates a processing procedure for the hypodlergenic formula of the invention.

EXAMPLE I

Weighing Procedure

All dry ingredients should be weighed out not more than 12 hours prior to processing of the hypoallergenic formula.

I. Preparation of Oil Blend

A. Weigh out and combine safflower oil, MCT oil and soy oil into a stainless steel steam-jacketed kettle. Heat the oil blend to 60°-65° C.

B. Weigh out the fat soluble vitamins consisting of vitamin A palmitate, vitamin D3, alpha-tocopheryl acetate and phylloquinone and add to the oil blend. Maintain the oil blend at the 60°-65° C. and set aside until used.

II. Mixing Procedure

A. Weigh out proper amount of water and pour into a separate stainless steel steam-jacketed kettle (amount of water is slightly less than formula requires). Reserve a small amount of water to dissolve trace minerals, amino acids and water soluble vitamins. Heat the water to 70°-75° C.

B. Weigh out calcium hydroxide, calcium citrate and calcium phosphate monobasic and dissolve in the hot (70°-75° C.) water.

C. Weigh out and combine the protein hydrolysate, sucrose, octenyl succinic anhydride modified corn starch and carrageenan. Dissolve the combined ingredients in the mineral slurry while stirring constantly.

D. Add the oil blend to the protein hydrolysate/carbohydrate/mineral slurry. Maintain the temperature of the liquid slurry at 70°-75° C. and hold for 20 minutes while stirring constantly. Adjust the pH of the slurry to 6.0-7.0.

III. Homogenization Procedure

Prior to homogenization, pass the slurry through a preheater to heat the liquid at 79° C. Homogenize one time using double stage homogenizer at a total pressure of 3000-4000 psi with 500 psi for the second stage. Immediately following homogenization, pass the liquid through a cooler at 4° C. Determine the % solids.

IV. Weigh out the remainder of the minerals and trace minerals and dissolve in water in the following order: sodium chloride, magnesium chloride, potassium chloride, potassium citrate, ferrous sulfate, zinc sulfate, cupric sulfate and manganese sulfate. Add the dissolved mineral solution to the product slurry.

V. Weigh out and dissolve the following amino acids: L-tryptophan, L-methionine, L-cystine-2 HCL, L-tyrosine, taurine and L-carnitine in water and add the dissolved amino acid solution to the product slurry.

VI.

A. Weigh out and dissolve the following water soluble vitamins in water: vitamin B1, vitamin B2, vitamin B6, vitamin B12, niacinamide, biotin, folic acid, calcium pantothenate, inositol and choline chloride. Add the dissolved water soluble vitamins to the product slurry.

B. Adjust the pH of the liquid product to 6.0-7.0. Add water to bring the solids to about 13%.

VII. Filling and Sterilization

A. Fill 32 fluid ounce cans (976 gram) or 8 fluid ounce glass bottle or can (244 gram) with the liquid formula.

B. Seam the containers with 16-20 inches of vacuum.

C. Sterilize the product with an adequate sterilization process as recommended by the FDA for low acid foods.

The advantages of the present invention are (1) a shelf stable ready-to-feed liquid product (with a 12-month shelf life) that has a pH common to human milk which enhances patient acceptability, and (2) a product without browning. Browning is undesirable both because of the appearance and because many of the products of the Maillard reaction are indigestible and cannot be absorbed in the small intestine. These browning reaction by-products are fermented in the colon resulting in acid stool, gas, diarrhea, water and electrolyte losses.

Tables II and III below indicate the stability of the improved hypoallergenic formula in terms of amino acid composition after sterilization and again after storage at room temperature for twelve months.

TABLE II

Effect of Terminal Sterilization and 12 Month Storage at Room Temperature on Amino Acids of Hypoallergenic Formula (pH about 6.0-6.5) Soy Hydrolysate Formula

| Amino Acid mg/g P.E.* | Before Terminal Sterilization | After Terminal Sterilization | After 12 Month Storage at Room Temperature |
|---|---|---|---|
| Aspartic Acid | 118.5 | 120.4 | 120.1 |
| Threonine | 35.7 | 36.0 | 38.0 |
| Serine | 49.5 | 51.6 | 52.5 |
| Glutamic Acid | 205.7 | 210.0 | 212.2 |
| Proline | 31.7 | 33.0 | 37.9 |
| Glycine | 36.8 | 37.6 | 37.9 |
| Alanine | 41.4 | 42.2 | 42.3 |
| Cystine | 10.5 | 9.9 | 10.5 |
| Valine | 46.3 | 47.1 | 47.6 |
| Methionine | 22.0 | 22.8 | 23.4 |
| Isoleucine | 41.0 | 41.9 | 42.7 |
| Leucine | 71.2 | 72.6 | 71.3 |
| Tyrosine | 20.9 | 25.0 | 25.8 |
| Phenylalanine | 28.9 | 30.4 | 30.8 |
| Histidine | 17.8 | 17.8 | 18.1 |
| Lysine | 65.5 | 66.3 | 65.9 |
| Arginine | 65.3 | 66.5 | 63.3 |
| Tryptophan | 7.1 | 7.0 | — |
| Available Lysine | 66.2 | 66.3 | 64.8 |

*Protein Equivalent

TABLE III

Effect of Terminal Sterilization and 12 Month Storage at Room Temperature on Amino Acids of Hypoallergenic Formula (pH about 6.5-7.0) Casein Hydrolysate Formula

| Amino Acid mg/g P.E.* | Before Terminal Sterilization | After Terminal Sterilization | After 12 Month Storage at Room Temperature |
|---|---|---|---|
| Aspartic Acid | 80.2 | 79.6 | 76.7 |
| Threonine | 39.6 | 39.8 | 39.8 |
| Serine | 45.3 | 43.5 | 43.4 |
| Glutamic Acid | 224.19 | 222.0 | 219.0 |
| Proline | 76.2 | 82.0 | 94.5 |
| Glycine | 24.8 | 24.9 | 24.7 |
| Alanine | 36.5 | 36.2 | 36.1 |
| Cystine | 11.0 | 11.0 | 10.4 |

TABLE III-continued

Effect of Terminal Sterilization and 12 Month
Storage at Room Temperature on Amino Acids of
Hypoallergenic Formula (pH about 6.5-7.0)
Casein Hydrolysate Formula

| Amino Acid mg/g P.E.* | Before Terminal Sterilization | After Terminal Sterilization | After 12 Month Storage at Room Temperature |
|---|---|---|---|
| Valine | 68.6 | 67.5 | 66.9 |
| Methionine | 28.6 | 28.3 | 28.5 |
| Isoleucine | 55.5 | 55.2 | 56.4 |
| Leucine | 95.3 | 93.7 | 92.0 |
| Tyrosine | 9.5 | 10.5 | 13.9 |
| Phenylalanine | 42.7 | 41.0 | 42.0 |
| Histidine | 23.5 | 23.4 | 23.4 |
| Lysine | 78.9 | 77.1 | 76.7 |
| Tryptophan | 9.0 | 7.6 | — |
| Available Lysine | 63.1 | 73.1 | 75.1 |

*Protein Equivalent

While the hypoallergenic formula is preferably provided in a ready-to-feed liquid form, it may also be concentrated by increasing the percent total solids of the formula or made in powder from, both procedures being well known to those skilled in the art. The concentrate or powder are then reconstituted for feeding by adding water.

While specific examples have been given to illustrate the invention, it is to be understood that those skilled in the art will recognize variations without departing from the spirit and scope of the invention.

What is claimed is:

1. In an improved enteral nutritional hypoallergenic formula comprising, based on total calories of the formula, about 35% to about 60% carbohydrates, about 35% to about 55% lipids and about 8% to about 20% protein hydrolysate, the improvement wherein the formula further comprises as a sole emulsifier a dextrinized starch modified by octenyl succinic anhydride in an amount sufficient to form a stable, non-browning emulsion at a pH from about 6 to about 7.

2. The hypoallergenic formula of claim 1 wherein the protein hydrolysate is supplemented with free amino acids.

3. The hypoallergenic formula of claim 1 wherein the formula caloric distribution comprises about 40% to about 45% carbohydrates, about 45% to about 50% lipids, and about 10% to about 14% protein hydrolysate and free amino acids.

4. The hypoallergenic formula of claim 1 further comprising vitamins and minerals.

5. The hypoallergenic formula of claim 1 wherein the starch comprises octenyl succinic anhydride modified corn starch.

6. The hypoallergenic formula of claim 1 wherein the modified starch comprises octenyl succinic anhydride modified corn starch and wherein the carbohydrates are selected from the group consisting of sucrose, low D.E. maltodextrins and hydrolyzed starches, the lipids comprise safflower oil, medium chain triglycerides, and soy oil, and the protein hydrolysate is selected from the group consisting of animal and vegetable protein hydrolysates and mixtures thereof.

7. The hypoallergenic formula of claim 6 wherein the lipids comprise at least 10% linoleic acid.

8. The hypoallergenic formula of claim 1 wherein the formula is provided as a ready-to-feed liquid, a concentrated liquid or a powder.

9. The hypoallergenic formula of claim 6 wherein the animal hydrolysate is selected from the group consisting of whey or casein hydrolysate.

10. The hypoallergenic formula of claim 6 wherein the vegetable hydrolysate comprises soy hydrolysate.

11. The hypoallergenic formula of claim 1 further comprising a carrageenan or xanthan gum stabilizer.

* * * * *